United States Patent
Kotab (10) Patent No.: US 9,232,174 B1
(45) Date of Patent: Jan. 5, 2016

(54) METHODS FOR RECEIVING AND SENDING VIDEO TO A HANDHELD DEVICE

(76) Inventor: Dominic M. Kotab, San Jose, CA (US)

( * ) Notice: Subject to any disclaimer, the term of this patent is extended or adjusted under 35 U.S.C. 154(b) by 548 days.

(21) Appl. No.: 12/491,954

(22) Filed: Jun. 25, 2009

Related U.S. Application Data (60) Provisional application No. 61/075,589, filed on Jun. 25, 2008.

(51) Int. Cl.
*H04N 7/01* (2006.01)
*H04N 5/85* (2006.01)
*H04N 21/2343* (2011.01)

(52) U.S. Cl.
CPC ......... *H04N 5/85* (2013.01); *H04N 21/234363* (2013.01)

(58) Field of Classification Search
CPC ............ H04N 5/85; H04N 21/234363; H04N 21/234381
See application file for complete search history.

(56) References Cited

U.S. PATENT DOCUMENTS

| | | | | |
|---|---|---|---|---|
| 4,963,995 | A * | 10/1990 | Lang | 386/285 |
| 5,164,839 | A * | 11/1992 | Lang | 386/285 |
| 5,438,423 | A * | 8/1995 | Lynch et al. | 386/295 |
| 5,558,339 | A | 9/1996 | Perlman | |
| 6,020,912 | A * | 2/2000 | De Lang | 725/91 |
| 6,061,056 | A | 5/2000 | Menard et al. | |
| 6,920,281 | B1 | 7/2005 | Agnibotri et al. | |
| 7,068,316 | B1 | 6/2006 | Pine | |
| 7,167,639 | B2 * | 1/2007 | Haddad et al. | 386/241 |
| 7,191,462 | B1 | 3/2007 | Roman et al. | |
| 7,814,555 | B2 * | 10/2010 | Iwamoto et al. | 726/27 |
| 8,965,183 | B1 | 2/2015 | Kotab | |
| 2001/0013129 | A1 | 8/2001 | Asai et al. | |
| 2003/0041334 | A1 | 2/2003 | Lu | |
| 2004/0237104 | A1 * | 11/2004 | Cooper et al. | 725/38 |
| 2005/0275758 | A1 | 12/2005 | McEvilly et al. | |
| 2006/0210074 | A1 | 9/2006 | Ryu | |
| 2006/0233515 | A1 * | 10/2006 | Hino et al. | 386/46 |
| 2007/0058923 | A1 | 3/2007 | Buhler | |
| 2007/0110389 | A1 * | 5/2007 | Hayashi et al. | 386/52 |
| 2007/0111717 | A1 * | 5/2007 | Mueller et al. | 455/418 |
| 2007/0274675 | A1 | 11/2007 | Park | |
| 2008/0089362 | A1 | 4/2008 | Ezra et al. | |
| 2008/0118223 | A1 | 5/2008 | Kamiwada et al. | |
| 2008/0162713 | A1 | 7/2008 | Bowra et al. | |
| 2008/0178232 | A1 * | 7/2008 | Velusamy | 725/88 |
| 2009/0044128 | A1 * | 2/2009 | Baumgarten et al. | 715/738 |

(Continued)

OTHER PUBLICATIONS

Final Office Action from U.S. Appl. No. 12/362,966 dated Oct. 10, 2012.

(Continued)

*Primary Examiner* — Huy T Nguyen
(74) *Attorney, Agent, or Firm* — Zilka-Kotab, PC (57) ABSTRACT

A method for receiving and sending a television program according to one embodiment includes receiving a request to record a television program and receiving the television program. Further, the method includes storing a representation of the television program on a computer readable medium. Also, the method includes receiving a request to send the representation of the television program to a handheld device. Additionally, the method includes reducing a size of the representation of the television program and sending the reduced-size representation of the television program to the handheld device. Other systems and methods are also included.

30 Claims, 4 Drawing Sheets

(56) References Cited

U.S. PATENT DOCUMENTS

2009/0070407 A1* 3/2009 Castle et al. ................. 709/203
2009/0298485 A1* 12/2009 Lee et al. .................... 455/414.3
2011/0087549 A1* 4/2011 Ho ............................. 705/14.64
2012/0057848 A1* 3/2012 Casagrande ................. 386/245
2012/0201507 A1* 8/2012 Kunii et al. .................. 386/230

OTHER PUBLICATIONS

Non-Final Office Action Summary from U.S. Appl. No. 12/362,966 dated Nov. 10, 2011.

Non-Office Action from U.S. Appl. No. 12/362,966 dated Jun. 5, 2013.

Final Office Action from U.S. Appl. No. 12/362,966 dated Jan. 6, 2014.

Kotab, D., U.S. Appl. No. 12/362,966, filed Jan. 30, 2009.

Notice of Allowance from U.S. Appl. No. 12/362,966, dated Sep. 22, 2014.

Corrected Notice of Allowability from U.S. Appl. No. 12/362,966, dated Nov. 20, 2014.

Kotab, D., U.S. Appl. No. 14/621,239, filed Feb. 12, 2015.

\* cited by examiner

METHODS FOR RECEIVING AND SENDING VIDEO TO A HANDHELD DEVICE

CROSS REFERENCE TO RELATED APPLICATIONS

This application claims priority to U.S. Prov. Pat. Appl. No. 61/075,589 filed on Jun. 25, 2008, which is herein incorporated by reference.

FIELD OF THE INVENTION

The present invention relates to managing video data, and more particularly to methods for receiving and sending video data to handheld devices.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a method comprises receiving a request to record a television program; receiving the television program; storing a representation of the television program on a computer readable medium; receiving a request to send the representation of the television program to a handheld device; reducing a size of the representation of the television program; and transmitting the reduced-size representation of the television program to the handheld device.

In another general embodiment, a method includes receiving a request to store a video; storing a representation of the video on a computer readable medium; receiving a request to send the representation of the video to a handheld device; reducing a size of the video or representation thereof; and sending the reduced-size video or representation thereof to the handheld device via, at least in part, a wireless link.

In another general embodiment, a method comprises using a digital video recorder, receiving a program; using the digital video recorder, storing a representation of the program on a first computer readable medium; and using the digital video recorder, storing a second representation of the program on a second computer readable medium, the second computer readable medium being detachable from the digital video recorder.

Figure 1:
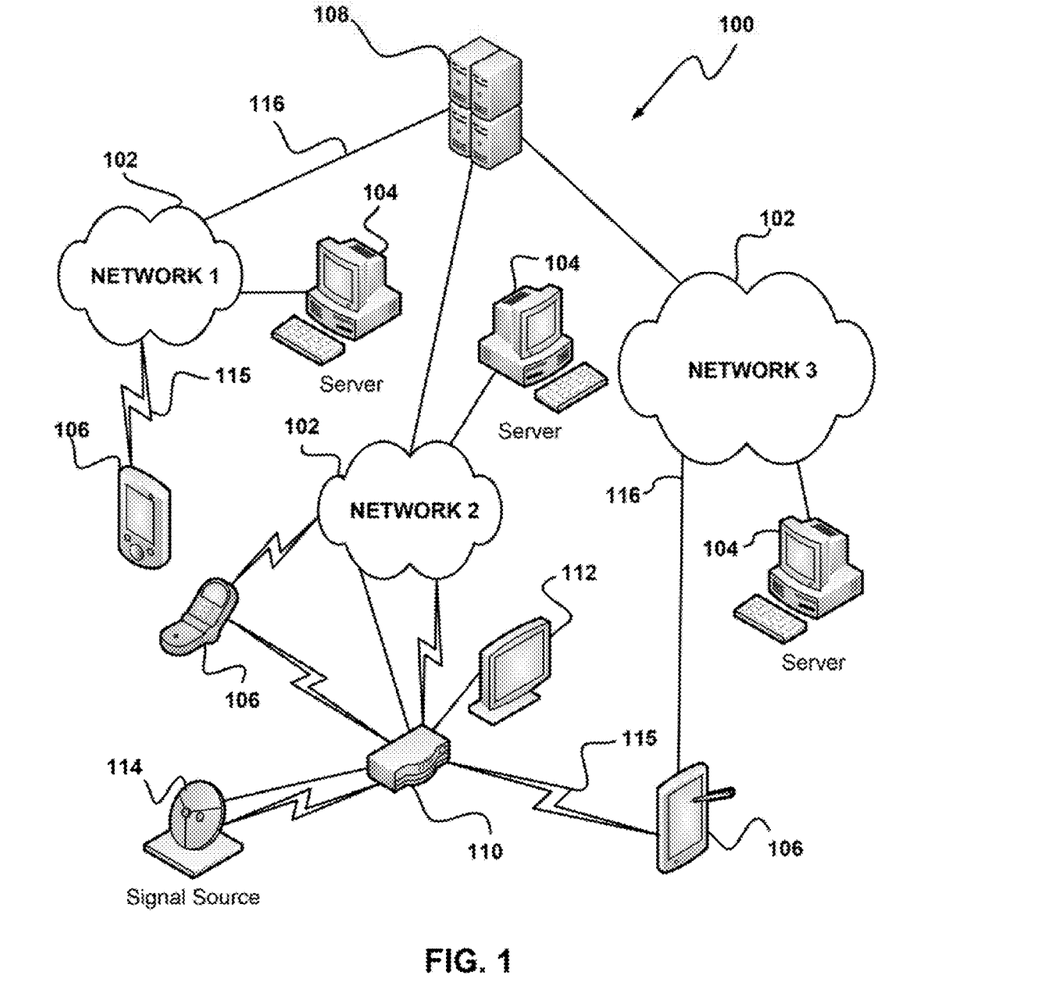
FIG. 1 is a schematic diagram of a network, showing a Digital Video Recorder communicating with various handheld devices, according to one embodiment.

FIG. 1 is a schematic diagram of a network including a Digital Video Recorder (DVR) and various handheld devices according to one embodiment. The network architecture 100, in accordance with one embodiment, may include a plurality of networks 102. In the context of the present network architecture 100, the networks 102 may each take any form including, but not limited to, a local area network (LAN), a wireless network (e.g., Wi-Fi) or link (e.g., Bluetooth), a wide area network (WAN) such as the Internet, cable television network, telephony network, peer-to-peer network, etc. In addition, more than one network may be included under each network 102.

Coupled to the networks 102 are servers 104 which are capable of communicating over the networks 102. Also coupled to the networks 102 and the servers 104 is a plurality of clients 106. Such servers 104 may include a mainframe computer, network appliance, desktop computer, lap-top computer, hand-held computer, mobile phone, smart phone, and other types of mobile media devices (with or without telephone capability), personal digital assistant (PDA), peripheral (e.g. printer, etc.), any component of a computer, and/or any other type of logic. In order to facilitate communication among the networks 102, at least one gateway 108 is optionally coupled therebetween. The at least one gateway 108 may be a router, server, computer, etc., configured such that communications between connected devices is enacted (possibly faster, easier, with different operating systems, etc.).

The communication lines 115 indicate wireless connections, while the communication lines 116 indicate hardwired connections. These communication types are shown for illustrative purposes only, and should in no way limit the scope of the invention, e.g., any connection can be hardwired or wireless. For instance, a client 106 may communicate with a network 102 wirelessly 115, as shown in Network 1, or a client 106 may communicate with a network 102 via hardwired connections 116, as shown in Network 3.

A hardwired connection may be any connection which uses a wire, cord, cable, etc., to connect devices together and allow communications between such devices. Some illustrative hardwire connections include Ethernet, serial, USB, parallel, FIREWIRE, etc. A wireless connection may be any connection which uses a wireless communication technique with which to communicate between two or more devices, possibly over a distance. Some illustrative wireless connections include radio frequency (RF) communication (such as Wi-Fi, Bluetooth, W-LAN, mobile telephony network—3G, CDMA, etc.), microwave communication, satellite communication (such as Global Positioning Satellite—GPS), infrared (IR) communication, etc.

In the context of the network architecture 100, a recording device 110, such as a Digital Video Recorder (DVR), computer system, tape-based recording system, etc., may be integrated and/or employed in the network architecture 100 that is capable of recording video content, transmitting content via wireless and/or wired techniques, and communicating with various handheld devices wirelessly and through network communications such as wireless telephone systems, Bluetooth, Wi-Fi, etc. As shown, the recording device 110 may be placed in communication with a network 102 either wirelessly or through hardwiring, or be placed in communication with a client 106, such as a handheld device, wirelessly. Additionally, the recording device 110 may be any type of device that is capable of receiving and recording video data, such as a digital video recorder (DVR), a computer with a TV-in card, an iPOD, an iPHONE, a BLACKBERRY device, a SLINGBOX device, etc.

Furthermore, the recording device 110 is capable of being placed in communication with a display 112. The display 112 may be a television, a computer monitor, a video projector, or any type of display. Such connection may be a direct connection, connection via network, connection via an additional device or devices, etc., and combinations thereof. In addition, the recording device 110 is capable of being placed in communication with a signal source 114. The signal source 114 may include any entity or device capable of providing a video signal to the recording device 110. For example, the signal source 114 may be an antenna receiving a signal from a television tower, a satellite signal, a satellite signal receiver, a satellite antenna, a video camera, a cable company's transmitter, a cable box, a digital set top box, a computer broadcasting network, another receiving device, etc.

In some embodiments, the recording device 110 may be placed in communication with a client 106. The client 106 may include a desktop computer, lap-top computer, handheld computer, mobile phone, personal digital assistant (PDA), network appliance, computer readable memory, digital music player, peripheral (e.g. printer, etc.), any component of a computer, and/or any other type of logic. The client 106 may communicate with the recording device 110 wirelessly.

Figure 2:
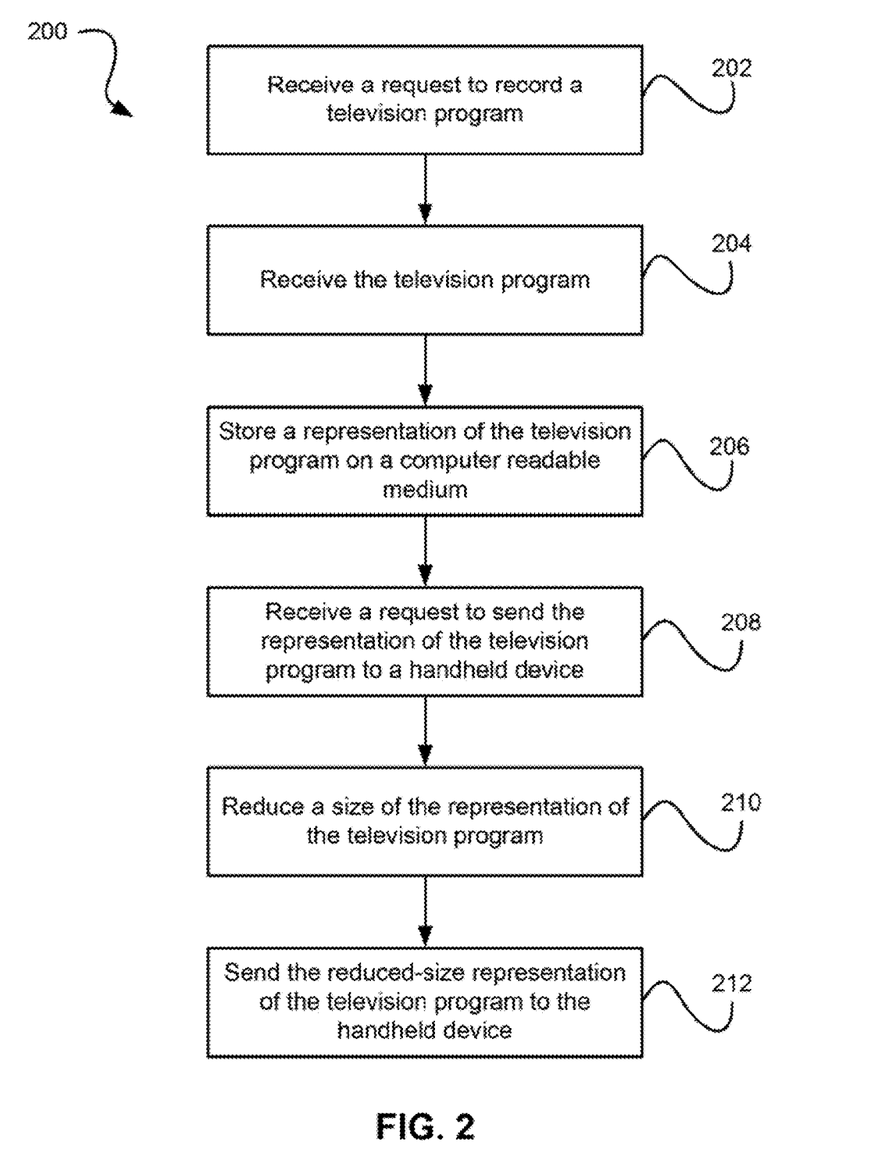
FIG. 2 shows a method according to one embodiment.

Now referring to FIG. 2, a method 200 according to one embodiment is shown. As an option, the method 200 may be implemented in the context of the architecture and environment of FIG. 1. Of course, however, the method 200 may be carried out in any desired environment.

With continued reference to FIG. 2, in operation 202, a request to record a television program is received. This request to record a television program may be initiated on a handheld device, on the interim (such as through a website, email, etc.), directly through a user interface with a recording device, etc. Further, the television program may be any type of programming related to television. For example, the television program may be from subscription programming, pay-per-view (PPV) programming, public broadcast programming, television programs broadcast over the Internet, YOUTUBE television content, iTUNES store television content, etc.

In operation 204, the television program is received. The television program may be received through hardwired or wireless connections. Further, the connections may be with an intermediary device such as a cable box, set top box, satellite antenna box, another device (such as a video cassette recorder (VCR), digital video disc (DVD) player, camcorder, gaming console—such as PLAYSTATION 3, XBOX, etc.), aerial antenna, computer equipped with TV-in card, network appliance, etc. This intermediary device may receive the television program from a service provider, such as a cable television service, satellite television service provider, online content provider, Internet service provider, etc.

In some embodiments, the intermediary device may receive the signal from a remote source or from a local receiver. For example, in one embodiment, a cable box may receive a digital or analog television signal through a coaxial cable. In another embodiment, a satellite dish may receive a digital or analog television signal from a satellite transmitter. In yet another embodiment, a network appliance may receive a digital signal from a Wi-Fi network. In still another embodiment, an antenna may receive an analog or digital terrestrial television signal from a transmitter. However, the television program may be received in the intermediary device in any manner, and the intermediary device may be integrated with the receiving device.

In operation 206, a representation of the television program is stored (e.g., digital or analog) on a computer readable medium, such as diskette, Secure Digital (SD) Card, MEMORY STICK, CD-ROM, DVD-ROM, ROM, FLASH memory, hard disk drive, etc. The representation may be a duplicate of the program as received from the source, a compressed version of the received program, a converted version of the received program (e.g., for compatibility with a handheld device), an upconverted version of the received program (e.g., upconverting standard definition broadcasting to 720p, 1080i, 1080p, etc.), and combinations thereof, etc.

In operation 208, a request to send the representation of the television program to a handheld device is received. In one embodiment, the request to send the representation of the television program to the handheld device may be initiated on the handheld device.

In another embodiment, the request to send the representation of the television program to the handheld device may be initiated on a website, e.g., an URL can be accessed via the Internet for initiating the request to send the representation of the television program.

In yet another embodiment, the request to send the representation of the television program to the handheld device may be initiated on a device that stores the representation of the television program, such as any of the devices described previously.

In operation 210, a size of the representation of the television program is reduced. Additionally, in operation 210, a reduced quality representation of the television program may be created from the representation of the television program. The reducing may be performed in any manner. For example, periodic snapshots may be extracted from the representation of the television program, e.g., an image representative of the signal may be extracted at specified times and/or randomly and stored. In another example, the framerate of the representation of the television program may be lowered. In this way, a representation that is stored as 30 frames per second (fps) may be reduced to 24 fps, 20 fps, 15 fps, 10 fps, etc. In still another example, the representation of the television program may be compressed. In one embodiment, the compressing may occur at any ratio. For example, the compressing may occur at a ratio of about 1.1:1 to about 10000:1. Particular examples include about 2:1, about 3:2, about 50:1, about 96:1, about 1000:1, about 5000:1, etc. In another embodiment, the quality of the reduced quality representation of the television program may be set by a user. In yet another embodiment, the resolution of the representation of the television program may be reduced.

Of course, the many options as to how the representation of the television program is reduced, requested to be sent, stored, etc., may be controlled from any of the devices involved in such actions, such as the handheld device, the device storing the representation, an intermediary device receiving and/or sending requests, etc. For example, on the handheld device, a user may select the quality of the representation of the television program, and may take into account certain criteria, such as bandwidth of the transmission channel, time available for transferring, image quality desired, display size where the representation will be displayed, etc. Any of these criteria may persuade a user to choose a certain compression/quality/size of the representation of the television program. In another embodiment, the choices may be set automatically based on these and possibly more criteria by one of the devices involved in the actions.

In yet another embodiment, the representation of the television program quality is continuously reduced as it is converted, where the representation of the television program may be continuously received, converted, and stored. In still another embodiment, the representation of the television program quality may be reduced after being stored. Additionally, the reduced quality representation of the television program may utilize less memory than the unaltered representation of the television program. For example, the reduced quality representation of the television program may utilize at least 1% less memory, at least 25% less memory, at least 75% less memory, at least 90% less memory, etc. relative to the amount of memory used to store the unaltered representation of the television program.

More information about reduced quality representations, as well as other functionality that may be used in various embodiments is presented in U.S. Prov. Pat. Appl. No. 61/024,851 filed Jan. 30, 2008, and U.S. patent application Ser. No. 12/362,966 filed Jan. 30, 2009, which are herein incorporated by reference.

In another embodiment, the screen size or resolution of the reduced quality representation of the television program may be lower than the screen size or resolution of the unaltered representation of the television program. For example, the screen size or resolution of the reduced quality representation of the television program may be at least 1% lower, at least 50% lower, at least 75% lower, at least 90% lower, etc. Reducing the screen size may result in a reduced resolution of the representation of the television program, but need not be so limited.

In operation 212, the reduced-size representation of the television program is sent to the handheld device. In one particularly preferred embodiment, the reduced-size representation of the television program may be sent to the handheld device at least in part via a wireless link. Furthermore, the wireless link may include a wireless telephone network (which may include voice and data, just data, just voice, etc.). Accordingly, the handheld device preferably includes a wireless telephone circuit.

In a preferred embodiment, the method 200 is performed by a DVR. The DVR may include additional functionality, such as Internet access, wireless networking, external memory storage, etc.

In another embodiment, the method 200 may further comprise receiving from the handheld device a request for a listing of the representations of the programs stored on the computer readable medium, and sending the listing of the representations to the handheld device. The listing will typically include a list of program titles, and optionally one or more of program length, description, date, airtime, actor names, etc., and may be sortable based on these criteria. The listing of the representations is preferably sent to the handheld device via a wireless network, and may also be sent via Bluetooth, hardwired connection, etc.

In a further embodiment, the request to send the representation of the television program to the handheld device is initiated on the handheld device and includes selection of an entry from the listing. This may include a user interface that displays the listing and allows the user to select from the listing that television program which the user wants to be sent to the handheld device, thus initiating the request to send the representation of the television program to the handheld device.

Figure 3:
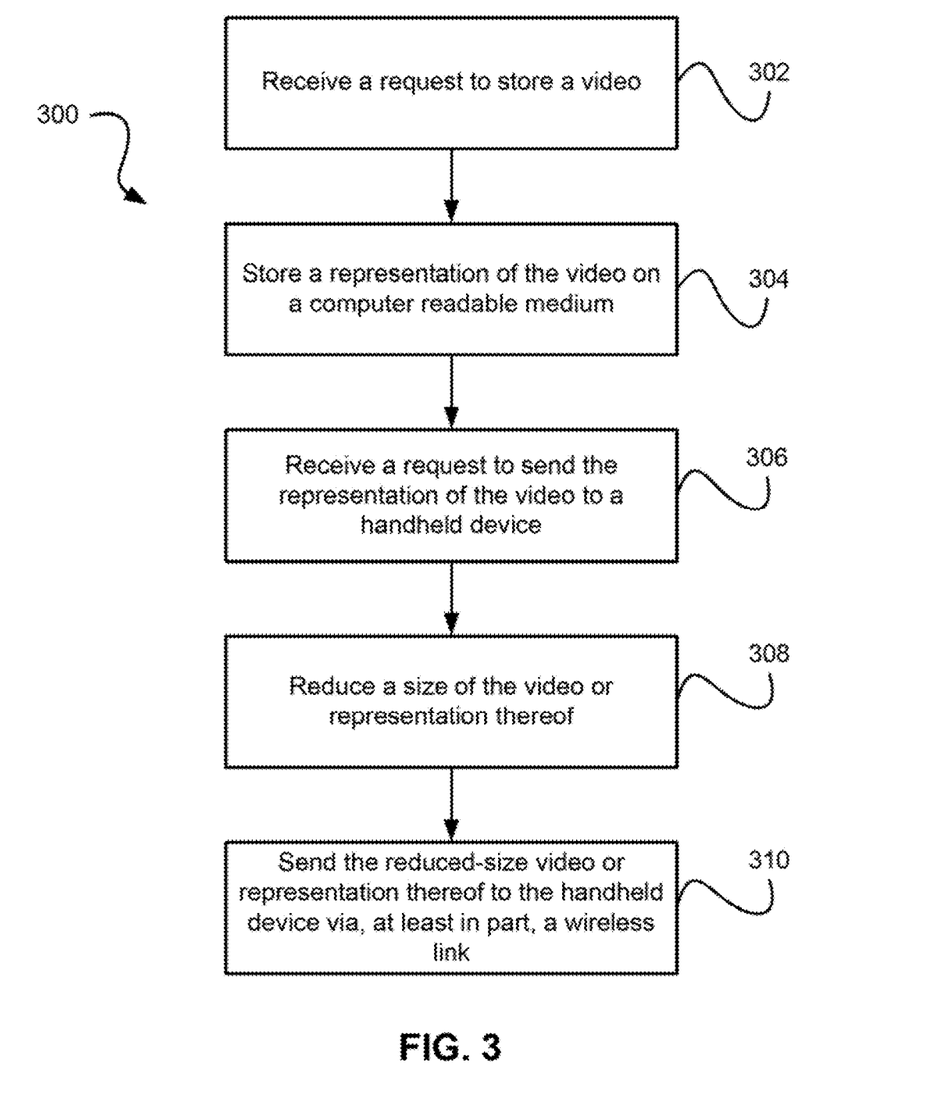
FIG. 3 shows a method according to one embodiment.

Now referring to FIG. 3, a method 300 according to one embodiment is shown. As an option, the method 300 may be implemented in the context of the architecture and environment of FIG. 1. Of course, however, the method 300 may be carried out in any desired environment and/or may include some of the functionality from FIG. 2.

With continued reference to FIG. 3, in operation 302, a request to store a video is received. The video may include any video content and data, including a television program, a video clip from the internet (such as from YOUTUBE, ITUNES, etc.), a camcorder recording, a mobile phone video recording, etc. Furthermore, the video may be formatted in any manner, such as by following standards from Motion Picture Editors Guild (MPEG, MPEG-2, MPEG-4), DivX, Xvid, FFmpeg, Windows Media Video (WMV), National Television System Committee (NTSC), Advanced Television Systems Committee (ATSC), THEORA, QuickTime (.mov), Audio Video Interleave (AVI), etc.

In operation 304, a representation of the video is stored on a computer readable medium, such as diskette, SD card, CD-ROM, DVD-ROM, ROM, FLASH memory, hard disk drive, etc. The representation of the video may be a duplicate of the video as received from the source, a compressed version, a converted version (such as for compatibility with a handheld device, increased image definition), etc.

In operation 306, a request to send the representation of the video to a handheld device is received. In one embodiment, the request to send the representation of the video to the handheld device is initiated on the handheld device. For example, the user may select a link or enter information that results in an instruction being sent to the appropriate device to initiate the transfer process.

In another embodiment, the request to send the representation of the video to the handheld device may be initiated on a website. For example, the user may select a link or enter information that results in an instruction being sent to the appropriate device to initiate the transfer process.

In yet another embodiment, the request to send the representation of the video to the handheld device may be initiated on a device that stores the representation of the video, e.g., through selection of a menu item, button on a screen, etc.

In operation 308, a size of the video or representation thereof is reduced. Additionally, in operation 308, a reduced quality video or representation thereof may be created from the video. The reducing may be performed in any manner. For example, periodic snapshots may be extracted from the video, e.g., an image representative of the signal may be extracted at specified times and/or randomly and stored. In another example, the framerate of the video may be lowered. In still another example, the video may be compressed. In one embodiment, the compressing may occur at any ratio. For example, the compressing may occur at a ratio of about 1.1:1 to about 10000:1. Particular examples include about 2:1, about 3:2, about 50:1, about 96:1, about 1000:1, about 5000:1, etc. In another embodiment, the quality of the reduced quality video or representation thereof may be set by a user. In yet another embodiment, the resolution of the video or representation thereof may be reduced.

In yet another embodiment, the video quality is continuously reduced as it is converted, where the video may be continuously received, converted, and stored. In still another embodiment, the video quality may be reduced after being stored. Additionally, the reduced quality video or representation thereof may utilize less memory than the unaltered video. For example, the reduced quality video or representation thereof may utilize at least 1% less memory, at least 25% less memory, at least 75% less memory, at least 90% less memory, etc. relative to the amount of memory used to store the unaltered video.

In another embodiment, the screen size or resolution of the reduced quality video or representation thereof may be lower than the screen size or resolution of the unaltered video. For example, the screen size or resolution of the reduced quality video or representation thereof may be at least 1% lower, at least 50% lower, at least 75% lower, at least 90% lower, etc. Reducing the screen size may result in a reduced resolution of the video or representation thereof, but need not be so limited.

In operation 310, the reduced-size representation of the video or representation thereof is sent to the handheld device. In one particularly preferred embodiment, the reduced-size video or representation thereof may be sent to the handheld device at least in part via a wireless link. Furthermore, the wireless link may include a wireless telephone network (which may include voice and data, just data, just voice, etc.). Accordingly, the handheld device preferably includes a wireless telephone circuit.

In a particularly preferred embodiment, the method 300 is performed on a DVR. The DVR may be a standalone unit or integrated with an intermediary device, such as a cable receiver, set top box, satellite receiver, etc.

In another embodiment, the method 300 may further comprise receiving from the handheld device a request for a listing of the videos or representations thereof stored on the computer readable medium, and sending the listing of the videos or representations thereof to the handheld device. The listing may include a list of video titles, and optionally one or more of video length, video description, date, airtime, actor names, raw size (e.g., in bytes, kilobytes, etc.) and/or actual or estimated size after reduction, etc., and may be sortable based on these criteria. The listing of the videos or representations thereof are preferably sent to the handheld device via a wireless network, and may also be sent via Bluetooth, hardwired connection, etc.

In a further embodiment, the request to send the videos or representations thereof to the handheld device is initiated on the handheld device and includes selection of an entry from the listing. This may include a user interface that displays the listing and allows the user to select from the listing that video or representation thereof which the user wants to be sent to the handheld device, thus initiating the request to send the video or representation thereof to the handheld device.

In a further approach, the user may be allowed to select a level of reduction, e.g., in terms of any of the foregoing parameters such as frame rate, resolution, etc.

In one embodiment, the reduced quality video or representation thereof may be stored as long as room is available on the storage subsystem. In another embodiment, a portion of the reduced quality video or representation thereof may be deleted, sent to another storage medium, or both, if it is determined that the storage subsystem is full. For example, if it is determined that the storage subsystem is full, oldest portions of the reduced quality video or representation thereof may be copied to a network-accessible hard drive and/or deleted from its current location.

In yet another embodiment, creating and/or storing the reduced quality video or representation thereof may be suspended upon receiving a disabling command. For example, the user may suspend creating and/or storing the reduced quality video or representation thereof on a video-by-video basis. In another example, the user may suspend creating and/or storing the reduced quality video or representation thereof on a temporal basis.

Furthermore, the disabling command may be set by the user. Further, the amount of the storage subsystem used for storing the reduced quality video or representation thereof may be determined by the user. For example, the user may select a certain percentage of the storage device to be used to store the reduced quality video or representation thereof.

Figure 4:
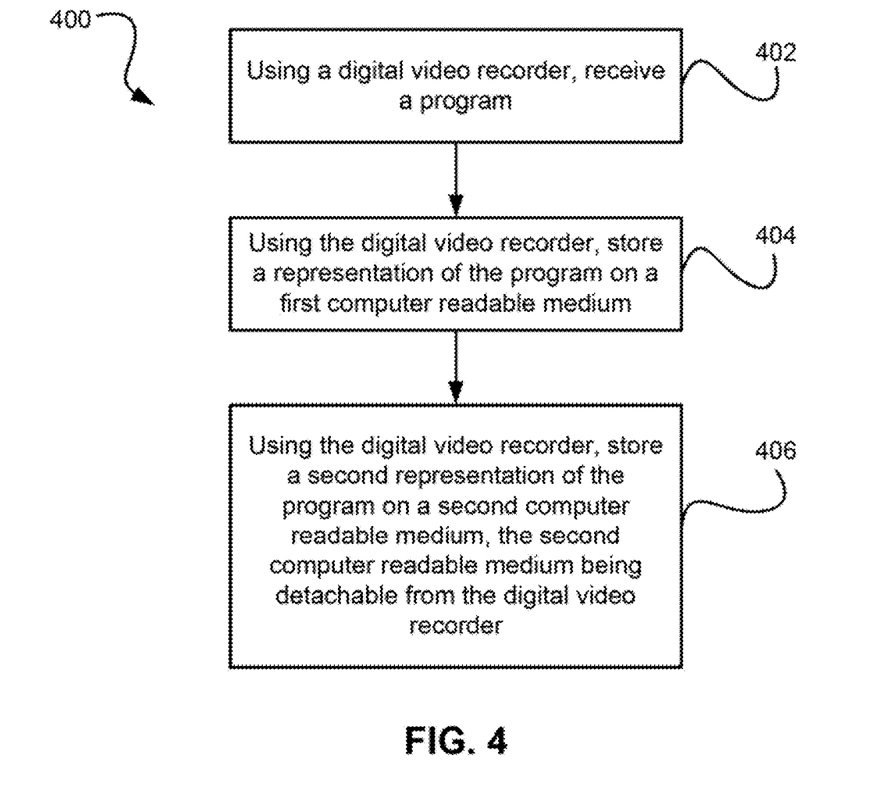
FIG. 4 shows a method according to one embodiment.

Now referring to FIG. 4, a method 400 according to one embodiment is shown. As an option, the method 400 may be implemented in the context of the architecture and environment of FIG. 1. Of course, however, the method 400 may be carried out in any desired environment and/or may include some of the functionality from FIGS. 2 and 3.

With continued reference to FIG. 4, in operation 402, a digital video recorder (DVR) is used to receive a program. Any type of DVR may be used. In one embodiment, the DVR may receive a program from an intermediary device such as a cable box, set top box, satellite antenna box, another device (such as a video cassette recorder (VCR), digital video disc (DVD) player, camcorder, etc.), aerial antenna, etc. This intermediary device may receive the program from a service provider, such as a cable television service, satellite television service provider, online content provider, etc.

In operation 404, the DVR is used to store a representation of the program on a first readable medium, such as diskette, Secure Digital (SD) Card, CD-ROM, DVD-ROM, ROM, FLASH memory, hard disk drive, etc. The representation may be a duplicate of the program as received from the source, a compressed version of the received program, a converted version of the received program (e.g., for compatibility with a handheld device), etc.

In operation 406, the DVR is used to store a second representation of the program on a second computer readable medium, the second computer readable medium being detachable from the DVR. The second computer readable medium may be of any detachable type, such as SD Card, FLASH drive, portable media player, etc.

In one embodiment, the second representation of the program may be a reduced size representation of the program. Any of the methods previously disclosed in regards to method 300 may be used to create this reduced-size second representation, such as compressing the file or program, reducing the representation quality, bit rate, screen size, etc.

In a particularly preferred embodiment, the program is a television program.

In other embodiments, the first computer readable medium may be a hard disk drive and the second computer readable medium may be a media card (e.g., SD card, Memory Stick, CompactFlash card, etc.), other device having solid state memory, or another hard disk drive.

In a further embodiment, the disk medium of the second computer readable medium has a smaller diameter than a disk medium of the first computer readable medium (e.g., the first computer readable medium may have about a 3.5 inch or about a 2.5 inch disk medium, while the second computer readable medium may have about a 2.5 inch or about a 1.0 inch disk medium).

While the present invention has been illustrated and described with reference to specific embodiments, further modification and improvements will occur to those skilled in the art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium such as a physical computer readable storage medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Additionally, some or all of the aforementioned code may be embodied on any computer readable storage media including tape, FLASH memory, system memory, hard drive, etc. Additionally, a data signal embodied in a carrier wave (e.g., in a network including the Internet) can be the computer readable storage medium.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A method, comprising:
receiving a first request to record a first television program, wherein the first request to record the first television program is initiated on a first handheld device;
receiving the first television program from an antenna, in a satellite signal and/or in a cable signal;
recording the first television program by storing a representation of the first television program on a computer readable medium of a digital video recorder;
receiving a first request to send the representation of the first television program from the digital video recorder to the first handheld device;
reducing a size of the representation of the first television program; and
sending the reduced-size representation of the first television program to the first handheld device via at least one of: the Internet, a wireless or local area network having a router and/or gateway between the digital video recorder and first the handheld device, and a mobile telephony network,
wherein the first request to send the representation of the first television program to the first handheld device is initiated on the first handheld device,
wherein reducing the size of the representation of the first television program is based, at least in part, on an attribute associated with at least one of: the Internet, the wireless or local area network having a router and/or gateway between the digital video recorder and the first handheld device, and the mobile telephony network.

2. The method of claim 1, wherein reducing the size of the representation of the first television program includes reducing a frame rate associated with the representation of the first television program.

3. The method of claim 1, wherein the representation of the first television program to be sent to the first handheld device is selected from a listing displayable on the first handheld device, wherein the listing includes an actual size of the representation of the first television program and an estimated size of the to be reduced representation of the first television program.

4. The method of claim 1, wherein reducing the size of the representation of the first television program is based, at least in part, on an attribute associated with the mobile telephony network, and wherein the representation of the first television program is sent to the first handheld device via the mobile telephony network.

5. The method of claim 1, wherein the first request to send the representation of the first television program to the first handheld device is initiated on the digital video recorder storing the representation of the television program.

6. The method of claim 1, wherein the representation of the first television program is an upconverted version of the first television program.

7. The method of claim 1, further comprising:
receiving a second request to record a second television program;
receiving the second television program from the antenna, in the satellite signal and/or in the cable signal;
recording the second television program by storing a representation of the second television program on the computer readable medium of the digital video recorder;
receiving a second request to send the representation of the second television program from the digital video recorder to a second handheld device;
reducing a size of the representation of the second television program; and sending the reduced-size representation of the second television program to the second handheld device via at least one of: the Internet, a wireless or local area network having a router and/or gateway between the digital video recorder and the second handheld device, and a mobile telephony network, wherein the second request to send the representation of the second television program to the second handheld device is initiated on the second handheld device, wherein reducing the size of the representation of the second television program is based, at least in part, on an attribute associated with at least one of: the Internet, the wireless or local area network having a router and/or the gateway between the digital video recorder and the second handheld device, and the mobile telephony network.

8. A method, comprising:
receiving a request to record a television program;
receiving the television program from an antenna, in a satellite signal and/or in a cable signal;
recording the television program by storing a representation of the television program on a computer readable medium of a digital video recorder;
receiving a request to send the representation of the television program from the digital video recorder to a handheld device;
reducing a size of the representation of the television program; and
sending the reduced-size representation of the television program to the handheld device via at least one of: Internet, a wireless or local area network having a router and/or gateway between the digital video recorder and the handheld device, and a mobile telephony network,
wherein the reduced-size representation of the television program is stored on a server in communication with the digital video recorder via the wireless or local area network,
wherein the reduced-size representation of the television program is sent to the handheld device from the server;
wherein the request to record the television program is initiated on the handheld device connected to the Internet.

9. The method of claim 8, further comprising receiving from the handheld device a request for a listing of the representations of the programs stored on the computer readable medium, and sending the listing of the representations to the handheld device, wherein the listing includes an actual size of each representation and an estimated size of each representation upon a size reduction thereof.

10. The method of claim 9, wherein the request to send the representation of the television program to the handheld device is initiated on the handheld device and includes selection of an entry from the listing.

11. A method, comprising:
storing a representation of a television program on a computer readable storage medium;
receiving a request to send the representation of the television program to a handheld device;
reducing a size of the representation of the television program;
storing the reduced-size representation of the television program on the computer readable medium; and
sending the reduced-size representation to the handheld device via, at least in part, a wireless link,
wherein reducing the size of the representation of the television program is based at least in part on a time available for transferring the representation of the television program to the handheld device.

12. The method of claim 11, wherein the request to send the representation of the television program to the handheld device is initiated on the handheld device.

13. The method of claim 12, wherein the television program to be sent to the handheld is selected from a listing displayable on the handheld device.

14. The method of claim 11, wherein the request to send the representation of the television program to the handheld device is initiated on a website.

15. The method of claim 11, wherein the representation of the television program is received from an intermediary device via a network, wherein the intermediary device is selected from the group consisting of: a cable box, set top box, and a satellite antenna box, wherein the request to send the representation of the television program to the handheld device is initiated on the intermediary device.

16. The method of claim 11, wherein the method is performed by a digital video recorder.

17. A method, comprising:
receiving a representation of a television program from an intermediary device selected from a group consisting of a cable box, set top box, and a satellite antenna box via a network;
receiving a request to record the television program, wherein the request is initiated on a handheld device connected to Internet;
receiving a request to send the representation of the television program to the handheld device;
reducing a size of the representation of the television program received from the intermediary device;
storing the reduced-size representation of the television program on a computer readable medium; and
sending the reduced-size representation to the handheld device via, at least in part, a wireless link,
wherein the method is performed by a digital video recorder;
wherein the intermediary device is also a digital video recorder that stores a representation of the television program.

18. The method of claim 11, wherein storing the representation of the television program on the computer readable storage medium is in response to receiving a request from the handheld device to record the television program.

19. The method of claim 11, further comprising receiving from the handheld device a request for a listing of all representations of television programs stored on the computer readable medium, and sending the listing of the representations to the handheld device, wherein the request to send the television program to the handheld device is initiated on the handheld device and includes selection of an entry from the listing.

20. The method of claim 19, wherein each representation in the listing is associated with an actual size of the representation and an estimated size of a reduced-size version of each representation.

21. A method, comprising:
using a digital video recorder, receiving a program;
using the digital video recorder, storing a first representation of an entirety of the received program on a first computer readable medium; and
using the digital video recorder, storing a second representation of the entirety of the received program on a second computer readable medium, the second computer readable medium being detachable from the digital video recorder, wherein the second video representation of the program is a reduced-size representation of the program stored on the first computer readable medium, wherein the first and second representations are stored simultaneously.

22. The method of claim 21, wherein the program is a television program.

23. The method of claim 21, wherein the first computer readable medium is a hard disk drive, wherein the second computer readable medium is a media card.

24. The method of claim 21, wherein the first computer readable medium is a hard disk drive, wherein the second computer readable medium is a hard disk drive.

25. The method of claim 24, wherein a disk medium of the second computer readable medium has a smaller diameter than a disk medium of the first computer readable medium.

26. The method of claim 7, wherein the first request to send is received locally, and the second request to send is received remotely.

27. The method of claim 1, wherein the representation of the first television program is an identical duplicate of the first television program as received from the antenna, in the satellite signal and/or in the cable signal.

28. The method of claim 1, further comprising: determining whether there is available storage space on the computer readable medium; and, in response to determining that there is no available storage space on the computer readable medium, sending a copy of one or more portions of the reduced-size representation of the television program to a second computer readable medium and deleting the one or more portions of the reduced-size representation of the television program from the computer readable medium.

29. The method of claim 1, further comprising specifying a percentage of storage space on the computer readable medium for storing reduced-size representations of televisions programs.

30. The method of claim 17, wherein reducing the size of the representation of the television program is based at least in part on an attribute of the wireless link.

* * * * *